March 10, 1936. A. W. POUGHER ET AL 2,033,784
EXHAUST SILENCER FOR INTERNAL COMBUSTION ENGINES
Filed Nov. 30, 1934 2 Sheets-Sheet 1
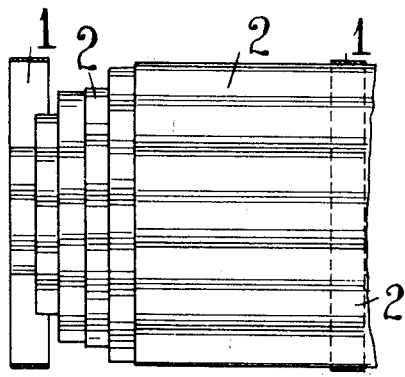
Fig.5.
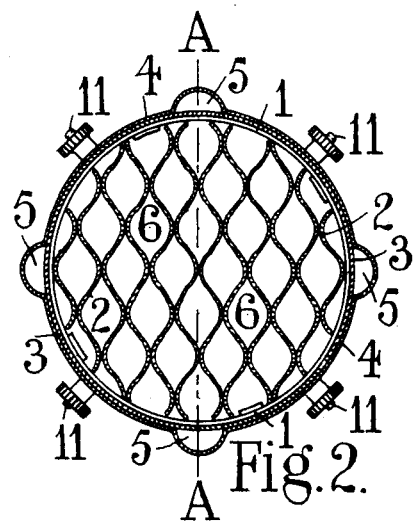
Fig.2.
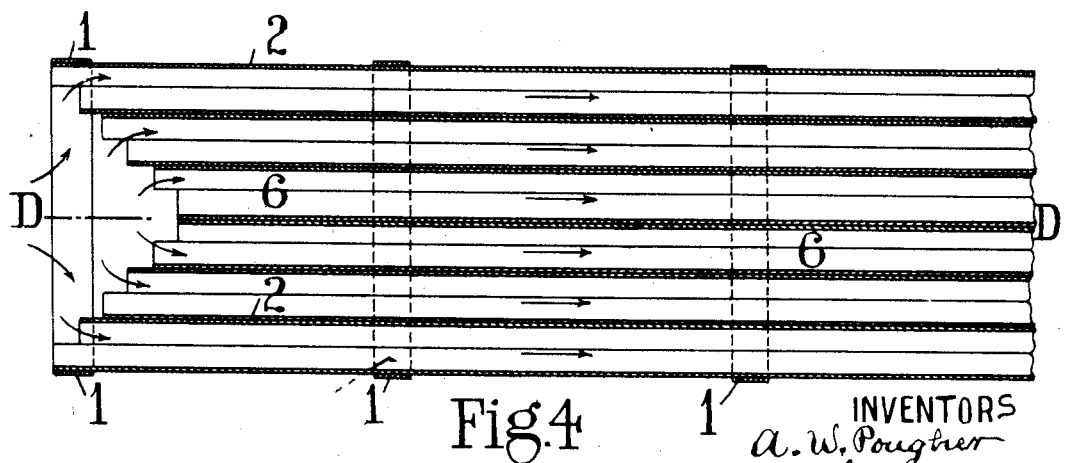
Fig.4.
INVENTORS
A. W. Pougher
Saml Fitton
J. Owden O'Brien
atty.

March 10, 1936.  A. W. POUGHER ET AL  2,033,784
EXHAUST SILENCER FOR INTERNAL COMBUSTION ENGINES
Filed Nov. 30, 1934   2 Sheets-Sheet 2
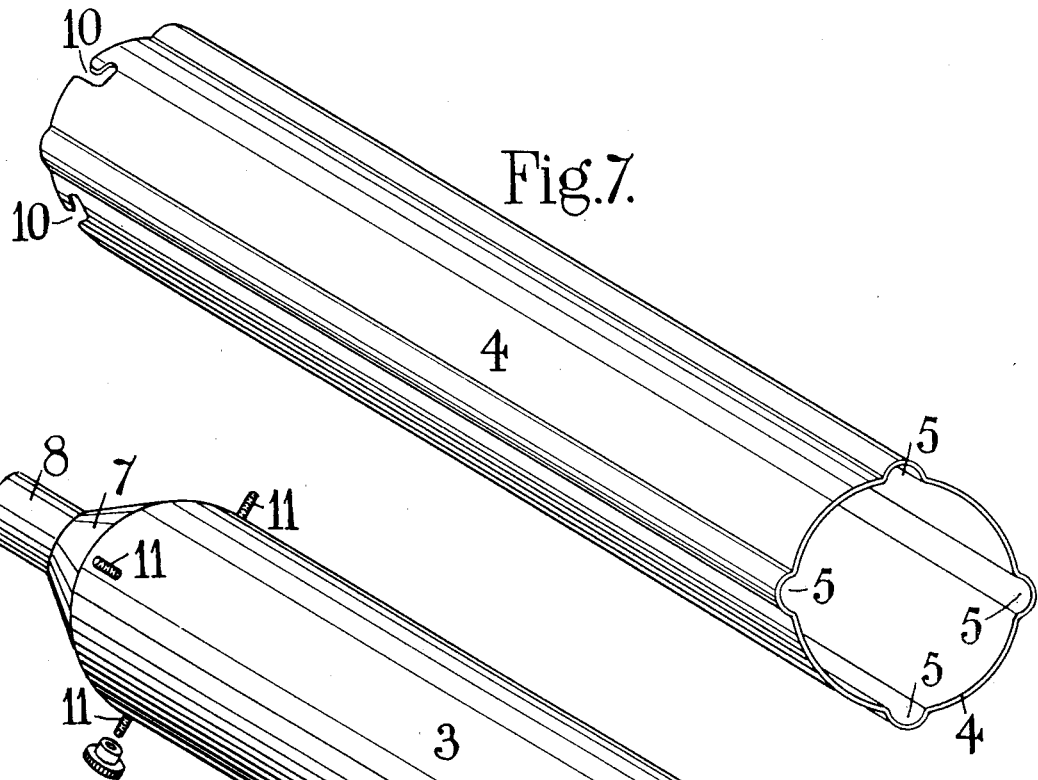
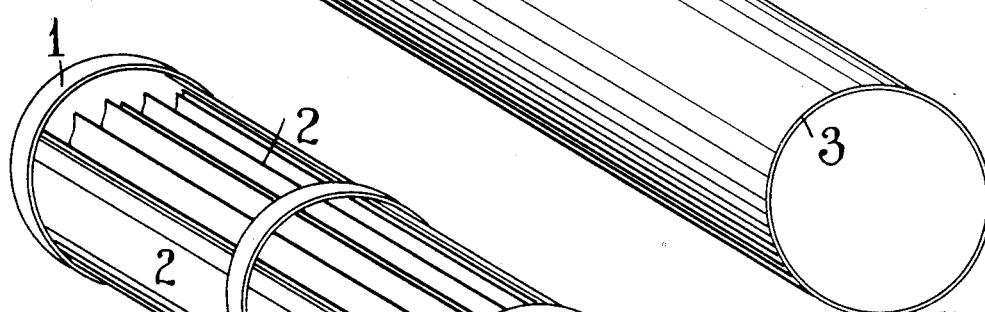
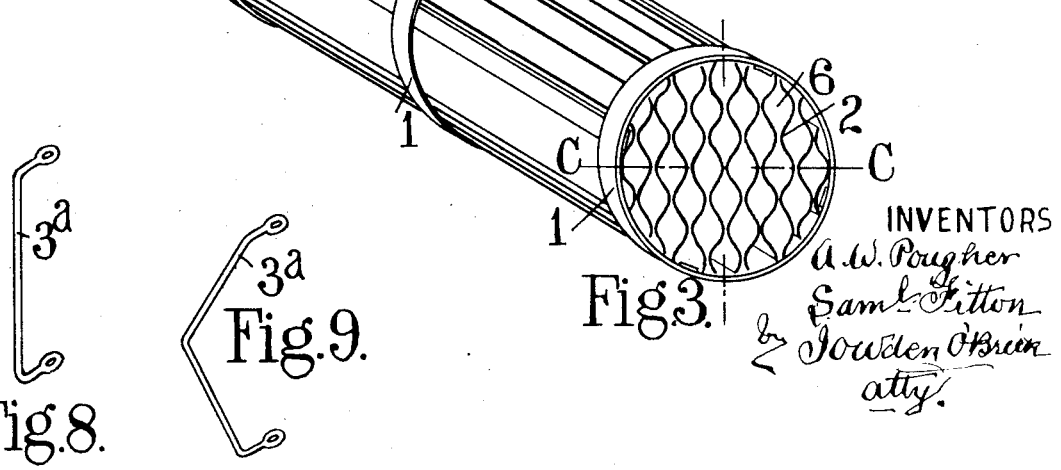
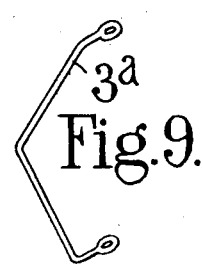

Patented Mar. 10, 1936

2,033,784

UNITED STATES PATENT OFFICE 2,033,784

EXHAUST SILENCER FOR INTERNAL COMBUSTION ENGINES

Arthur William Pougher and Samuel Fitton, Manchester, England

Application November 30, 1934, Serial No. 755,318
In Great Britain April 10, 1934

3 Claims. (Cl. 137—160)

This invention relates to improvements in silencers for the exhaust and/or inlet gases of internal combustion engines.

According to the invention the silencer comprises a container formed with a plurality of honeycomb cells or passages therethrough whereby the gases whilst passing through the silencer have a whirling motion in separate sections instead of in a combined mass.

The honeycomb formation of the silencer is formed by building up in a container a series of corrugated sheets or plates which may be of equal or variable length so arranged that corrugations in each adjacent pair of sheets or plates form longitudinal passages through the container. The corrugations in the sheets or plates may be of such shape as to produce passages of circular, elliptical or angular cross section and the corrugated sheets may be ribbed or fluted longitudinally to further assist the scouring of the gases.

The invention will be described with reference to the accompanying drawings in which:—

Fig. 1 is a longitudinal section on line A—A, Fig. 2 of a silencer formed in accordance with the invention.

Fig. 2 is a transverse section on line B—B, Fig. 1.

Fig. 3 is a perspective view of the corrugated sheet forming the honeycomb passages held together by a frame comprising a series of rings for insertion in the container.

Fig. 4 is a longitudinal section on line C—C, Fig. 3.

Fig. 5 is a section of the end of the corrugated sheets on line D—D, Fig. 4.

Fig. 6 is a perspective view of the container in which the sheets forming the honeycomb passages are housed.

Fig. 7 is a perspective view of an outer casing to receive the container having the honeycomb passages and provided with a series of air ducts or passages through which air passes for the purpose of cooling the gases in the silencer chambers.

Figs. 8 and 9 are perspective views of two different constructions of retaining bars 3ª.

The silencer comprises a number of corrugated sheets or plates 2 arranged in a container 3 in such a way that the corrugations in each adjacent pair of sheets or plates 2 form longitudinal honeycomb passages 6 through the container. The corrugations in the sheets or plates may be of any suitable shape to form passages 6 of circular, elliptical or angular cross section.

The corrugated plates or sheets 2 may be welded, soldered or otherwise affixed directly into the container 3 or they may be welded, soldered or otherwise affixed to a number of rings 1 forming a frame which can be readily inserted into and removed from the container 3. Or the corrugated plates or sheets 2 may be a sliding fit either in the container 3 or in the rings 1. In any of these constructions except when the plates or sheets 2 are welded or soldered directly into the container 3 they can be removed therefrom for cleaning or other purposes and readily replaced without the use of tools.

The inlet end 7 of the container 3 for attachment to the exhaust pipe of the engine is of truncated conical form terminating in a tubular portion 8 for connection to the exhaust pipe.

The ends of the corrugated plates or sheets 2 are arranged to form a V or cone at the exhaust pipe or inlet end of the silencer such V or cone having its base towards the exhaust inlet as shown in the drawings. If desired however the apex of the V or cone may be towards the exhaust inlet. Similarly the corrugated plates or sheets 2 may be arranged to form a V or cone at the outlet end of the silencer.

A retaining bar 3ª is preferably arranged at the end of the plates 2 to retain them in the container 3. The bar 3ª may be straight or angular according as to whether the ends of the plates are arranged in one plane or conically arranged.

The silencer chamber or container 3 is preferably surrounded by an outer cover or cylinder 4 in which it is a sliding fit, the cover or cylinder 4 being formed with a series of raised portions 5 which form air ducts through which air is drawn over the container 3.

The cover 4 is preferably made longer than the container 3 whereby when the two are assembled together a space 9 is formed at the outlet end of the silencer. The container 3 and cylinder 4 are preferably locked together by means of the bayonet slots 10 and 11.

The air ducts 5 in the cover 4 may be of fan or V formation towards the outlet end of the cover for the purpose of reducing resistance and to spread the heated air so that the exhaust gases as they leave the silencer chamber will be completely surrounded by a wall of heated air.

The air ducts 5 in the cover 4 bring cold air into direct contact with the outside of the silencer chamber or container 3, the air abstracting heat from the chamber or container thereby reducing the temperature of the gases passing therethrough.

Moreover as the air ducts 5 open into the chamber 9 at the end of the cover 4 into which the gases from the honeycomb passages 6 also pass the air serves to draw the gases through the silencer chamber on the principle of an ejector and the gases as they pass through the honeycomb passages 6 are surrounded by a cushion of air which prevents them from coming into contact with the outer walls of the silencer and blankets any drumming or impinging action of the gases on these walls. Furthermore the exhaust gases will be surrounded by a wall of heated air as they finally pass out of the silencer into the atmosphere which will delay the impinging of the gases on to the atmospheric air until such wall of heated air has merged into the atmospheric air.

A silencer constructed as hereinbefore described will increase the time taken for the exhaust gases to meet the surrounding air and consequently there will be a greater reduction in temperature of the gases with corresponding reduction in explosive force. Back pressure will be reduced to a minimum as the disintegrated exhaust gases being contained in separate honeycomb cells or passages will not be able to re-unite, thus the resistance to their free passage through the silencer is eliminated as the gases expand in sections instead of in the mass.

Although a silencer constructed as hereinbefore described is particularly applicable for use for silencing the exhaust gases of petrol driven engines it can also be used for silencing the inlet and/or exhaust gases of other internal combustion engines such as heavy oil engines and gas engines whether stationary or on moving vehicles.

What I claim as my invention and desire to protect by Letters Patent is:—

1. A silencer for internal combustion engines and analogous purposes comprising the combination with a cylindrical container of a plurality of corrugated plates therein arranged with the corrugations longitudinally of the container, the apices of the corrugations of one plate directly contacting with the apices of the corrugations of adjacent plates thereby forming a plurality of separate longitudinal quadralateral passages through the container, the said corrugated plates being arranged at the inlet end of the silencer to form a cone.

2. A silencer for internal combustion engines and analogous purposes comprising the combination with a cylindrical container of a plurality of corrugated plates therein arranged with the corrugations longitudinally of the container, the apices of the corrugations of one plate directly contacting with the apices of the corrugations of adjacent plates thereby forming a plurality of separate longitudinal quadralateral passages through the container, the said corrugated plates being arranged at the inlet end of the silencer to form a cone with its base towards the inlet.

3. A silencer for internal combustion engines and analogous purposes comprising the combination with a cylindrical container of a plurality of corrugated plates therein arranged with the corrugations longitudinally of the container, the apices of the corrugations of one plate directly contacting with the apices of the corrugations of adjacent plates thereby forming a plurality of separate longitudinal quadralateral passages through the container, the said corrugated plates being arranged at an inlet end of the silencer to form a cone with its apex towards the inlet.

ARTHUR WILLIAM POUGHER.
SAMUEL FITTON.